(12) United States Patent
Wellmann et al.

(10) Patent No.: US 12,387,160 B2
(45) Date of Patent: Aug. 12, 2025

(54) SYSTEMS AND METHODS FOR IMPROVING QUALITY OF ARTIFICIAL INTELLIGENCE MODEL

(71) Applicant: Fidelity Information Services, LLC, Jacksonville, FL (US)

(72) Inventors: Benjamin Wellmann, Boca Raton, FL (US); Gary Duma, Royal Oak, MI (US); Geoffrey Allan Sparke, Workington (GB); Brandon A. Castro, Jacksonville, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 233 days.

(21) Appl. No.: 17/645,595

(22) Filed: Dec. 22, 2021

(65) Prior Publication Data
US 2023/0196248 A1    Jun. 22, 2023

(51) Int. Cl.
*G06Q 10/06* (2023.01)
*G06F 18/21* (2023.01)
(Continued)

(52) U.S. Cl.
CPC ..... *G06Q 10/06375* (2013.01); *G06F 18/217* (2023.01); *G06N 20/00* (2019.01); *G06Q 10/0635* (2013.01)

(58) Field of Classification Search
CPC ......... G06Q 10/06375; G06Q 10/0635; G06N 20/00; G06F 18/217
See application file for complete search history.

(56) References Cited

U.S. PATENT DOCUMENTS

2016/0239402 A1*  8/2016  Zieder ...................... G06F 8/20
2017/0097623 A1*  4/2017  Van Camp ............. G06Q 50/04
(Continued)

FOREIGN PATENT DOCUMENTS

CA          3041289 A1 *  4/2018  ........... F16H 61/425

OTHER PUBLICATIONS

Patterson, Tom, and CPA Complex Solutions Executive. "The use of information technology in risk management." Complex Solutions Executive IBM Corporation (2015). (Year: 2015).*
(Continued)

*Primary Examiner* — Hamzeh Obaid
(74) *Attorney, Agent, or Firm* — Bookoff McAndrews, PLLC

(57) ABSTRACT

A method for improving the quality of a machine-learning based model includes generating a first query requesting a description of a change proposed to a system and an intended outcome of the change proposed; receiving a first response; generating a second query providing a risk of an incident associated with the change proposed and requesting justification of the change proposed in view of the risk; receiving a second response; generating a third query requesting an implementation plan for the change proposed; receiving a third response; generating an alert to an incident owner providing the description, intended outcome, risk, justification, and implementation plan of the change proposed; receiving a risk confirmation or rejection from the incident owner confirming or rejecting a relationship between the change proposed and the risk; and updating the machine-learning based model to learn an association between extracted features of the change and extracted features of the incident.

20 Claims, 6 Drawing Sheets

(51) Int. Cl.
   *G06N 20/00* (2019.01)
   *G06Q 10/0635* (2023.01)
   *G06Q 10/0637* (2023.01)

(56) References Cited

U.S. PATENT DOCUMENTS

| | | | | |
|---|---|---|---|---|
| 2017/0178038 | A1* | 6/2017 | Guven | G06Q 30/016 |
| 2017/0228253 | A1* | 8/2017 | Layman | G06F 11/3013 |
| 2018/0027006 | A1* | 1/2018 | Zimmermann | G06F 21/6218 |
| | | | | 726/11 |
| 2018/0046956 | A1* | 2/2018 | Marcu | G06Q 10/067 |
| 2018/0137443 | A1* | 5/2018 | Peer | G06Q 10/0635 |
| 2018/0373578 | A1* | 12/2018 | Bridges | G06F 11/3604 |
| 2020/0183769 | A1* | 6/2020 | Poghosyan | G06F 11/0751 |
| 2021/0081819 | A1* | 3/2021 | Polleri | H04L 51/02 |
| 2021/0157577 | A1* | 5/2021 | Sobran | G06F 11/302 |
| 2022/0261711 | A1* | 8/2022 | Krishna | G06Q 50/188 |
| 2022/0261732 | A1* | 8/2022 | Rajagopalan | G06Q 10/0635 |
| 2023/0120977 | A1* | 4/2023 | Rau | G06Q 10/0635 |
| | | | | 705/7.28 |

OTHER PUBLICATIONS

Lauritsen SM, Thiesson B, Jørgensen MJ, Riis AH, Espelund US, Weile JB, Lange J. The Framing of machine learning risk prediction models illustrated by evaluation of sepsis in general wards. NPJ digital medicine. Nov. 15, 2021;4(1):158. (Year: 2021).*
International Search Report issued in International Application No. PCT/US2022/082113 dated Mar. 13, 2023 (14 pages).

* cited by examiner

CHANGE REQUEST
NEW RECORD [NORMAL CHANGE VIEW]

200

⊘✱ DESCRIPTION — 210

[WHAT CHANGE ARE YOU MAKING?]
OS RELATED PATCH RELEASE(S) WILL BE APPLIED TO THE SERVER(S) NOTED AS PART OF THE STANDARD BASELINE PATCHING FOR SERVERS. BASELINES HAVE BEEN ALREADY COMMUNICATED TO SERVER AND PLATFORM OWNERS. SERVERS IN SCOPE FOR THIS PATCH IMPLEMENTATION ARE DEFINED IN CONFIGURATION ITEMS AS WELL AS ATTACH TO THIS TICKET. INSTALLING MONTHLY PATCHES RELEASED BY MICROSOFT ON THE SERVERS.
[WHAT IS THE INTENDED OUTCOME?]
SERVERS WILL BE COMPLIANT AND PROTECTED AGAINST VULNERABILITIES.

2955 CHARACTERS REMAINING OF 4000 CHARACTERS

⊘✱ CHANGE JUSTIFICATION — 220

[WHY DO YOU NEED TO MAKE THIS CHANGE? AND WHAT WILL BE THE REPERCUSSIONS OF NOT IMPLEMENTING THIS CHANGE TO CLIENTS OF COMPANY, SERVICES OR COMPANY DIRECTLY?]
WE ARE IMPLEMENTING MONTHLY MICROSOFT SECURITY PATCHES TO ENSURE SERVERS ARE COMPLIANT AND REMEDIATE MONTHLY VULNERABILITIES. IF WE DON'T PATCH THESE SERVERS, THESE SERVERS WILL BE VULNERABLE AND WOULD CAUSE SECURITY RISK TO COMPANY.

3302 CHARACTERS REMAINING OF 4000 CHARACTERS

⊘ CHANGE PLAN — 230

[TYPE IN HIGH LEVEL STEPS OF WHAT THE CHANGE PLAN IS. THIS NEEDS TO BE IN NON-TECHNICAL LANGUAGE UNDERSTANDABLE FOR EVERYONE TO REVIEW. DELETE OR ADD NUMBERS AS APPROPRIATE]
1. THE CHANGE IS FOR MONTHLY PATCHING ACTIVITY FOR WINDOWS SERVERS
2. CREATE A BASELINE FROM BIGFIX AND PUSH THE JOBS ACROSS SERVERS TO PATCH.
3. INSTALL THE PATCHES ON THE SERVERS, TO MAKE THEM COMPLIANT.
4. REBOOT THE SERVERS, ETC.

3588 CHARACTERS REMAINING OF 4000 CHARACTERS

SUBMIT    ADD T

SYSTEMS AND METHODS FOR IMPROVING QUALITY OF ARTIFICIAL INTELLIGENCE MODEL

TECHNICAL FIELD

Various embodiments of the present disclosure relate generally to improving the quality of an artificial intelligence model to predict and troubleshoot incidents in a system and, more particularly, to improving the quality of a machine-learning based model to assess a risk for a proposed modification to a system or troubleshoot an incident in the system.

BACKGROUND

Changes to any type of system creates some degree of risk that the system will not continue to perform as expected. Additionally, even if system performance is not immediately affected, a change to a system may cause later issues, and time may be lost to determine what caused the change in performance of the system.

For example, in software, deploying, refactoring, or releasing software code has different kinds of associated risk depending on what code is being changed. Not having a clear view of how vulnerable or risky a certain code deployment may be increases the risk of system outages. Deploying code always includes risks for a company, and platform modernization is a continuous process. A technology shift is a big event for any product, and entails a large risk and opportunity for a software company. When performing such operations, there is a great need to ensure that code is refactored in the most vulnerable areas and that a correct test framework is in place before starting a transition to newly deployed code.

Additionally, software companies have been struggling to apply rules for what changes are allowed in certain releases to avoid outages, and this process is rules based and/or manually subjective. Outages and/or incidents cost companies money in service-level agreement payouts, but more importantly, wastes time for personnel via rework, and may risk adversely affecting a company's reputation with its customers. Highest costs are attributed to bugs reaching production, including a ripple effect and a direct cost on all downstream teams. Also, after a modification has been deployed, an incident team may waste time determining what caused a change in performance of a system.

IT operations change requests for changes across the IT landscape can have varying levels of risk and impact. In large IT organizations, change-caused incidents may make up 70-80% of critical incidents, and hence cause a significant burden on IT teams.

Modern IT architectures have become increasingly complex. Incorrectly assessing change risk and impact through static surveys or guessing poses a significant risk to IT organizations and subsequent incidents and outages in production.

The present disclosure is directed to overcoming one or more of these above-referenced challenges.

SUMMARY OF THE DISCLOSURE

In some aspects, the techniques described herein relate to a method for improving the quality of a machine-learning based model, the method including, performing by one or more processors, operations including: generating a first query requesting a description of a change proposed to a system and an intended outcome of the change proposed; receiving a first response from a change owner to the first query; generating, based on the first response, a second query providing a risk of an incident associated with the change proposed and requesting justification of the change proposed in view of the risk; receiving a second response from the change owner to the second query; generating, based on the second response, a third query requesting an implementation plan for the change proposed; receiving a third response from the change owner to the third query; generating, based on the first, second, and third responses, an alert to an incident owner providing the description, intended outcome, risk, justification, and implementation plan of the change proposed; receiving, based on the alert, a risk confirmation or rejection from the incident owner confirming or rejecting a relationship between the change proposed and the risk; and updating, based on the risk confirmation or rejection, the machine-learning based model to learn an association between extracted features of the change and extracted features of the incident.

In some aspects, the techniques described herein relate to a method, wherein the operations further include: receiving a reported incident in the system; classifying the reported incident; predicting, by the machine-learning based model, a cause of the classified incident based on the learned association between extracted features of the change and extracted features of the incident; and providing the reported incident and the predicted cause to the incident owner and the change owner.

In some aspects, the techniques described herein relate to a method, wherein the operations further include: receiving, based on the provided reported incident and predicted cause, a prediction confirmation or rejection from one or more of the incident owner or the change owner confirming or rejecting a relationship between the predicted cause and the reported incident; and updating, based on the prediction confirmation or rejection, the machine-learning based model to learn the association between extracted features of the change and extracted features of the incident.

In some aspects, the techniques described herein relate to a method, wherein the learned association includes a temporal alignment of the change and the incident.

In some aspects, the techniques described herein relate to a method, wherein the temporal alignment is a 48 hour window between the change and the incident.

In some aspects, the techniques described herein relate to a method, wherein the operations are performed by using one or more Application Programming Interface (API) interactions.

In some aspects, the techniques described herein relate to a method, wherein the generated alert to the incident owner provides extracted keywords from the description, intended outcome, risk, justification, and implementation plan of the change proposed.

In some aspects, the techniques described herein relate to a method, wherein the association between extracted features of the change and extracted features of the incident provides a probability that the incident is caused by the change.

In some aspects, the techniques described herein relate to a method, wherein when the probability is above a predetermined threshold, the risk confirmation or rejection from the incident owner is automatically performed.

In some aspects, the techniques described herein relate to a method, wherein the change proposed includes one or more of a modification of a hardware component of the system, a modification of a software component of the system, or a modification of a team member of the system.

In some aspects, the techniques described herein relate to a computer-implemented system for improving the quality of a machine-learning based model, the computer-implemented system including: a memory to store instructions; and one or more processors to execute the stored instructions to perform operations including: generating a first query requesting a description of a change proposed to a system and an intended outcome of the change proposed; receiving a first response from a change owner to the first query; generating, based on the first response, a second query providing a risk of an incident associated with the change proposed and requesting justification of the change proposed in view of the risk; receiving a second response from the change owner to the second query; generating, based on the second response, a third query requesting an implementation plan for the change proposed; receiving a third response from the change owner to the third query; generating, based on the first, second, and third responses, an alert to an incident owner providing the description, intended outcome, risk, justification, and implementation plan of the change proposed; receiving, based on the alert, a risk confirmation or rejection from the incident owner confirming or rejecting a relationship between the change proposed and the risk; and updating, based on the risk confirmation or rejection, the machine-learning based model to learn an association between extracted features of the change and extracted features of the incident.

In some aspects, the techniques described herein relate to a computer-implemented system, wherein the operations further include: receiving a reported incident in the system; classifying the reported incident; predicting, by the machine-learning based model, a cause of the classified incident based on the learned association between extracted features of the change and extracted features of the incident; and providing the reported incident and the predicted cause to the incident owner and the change owner.

In some aspects, the techniques described herein relate to a computer-implemented system, wherein the operations further include: receiving, based on the provided reported incident and predicted cause, a prediction confirmation or rejection from one or more of the incident owner or the change owner confirming or rejecting a relationship between the predicted cause and the reported incident; and updating, based on the prediction confirmation or rejection, the machine-learning based model to learn the association between extracted features of the change and extracted features of the incident.

In some aspects, the techniques described herein relate to a computer-implemented system, wherein the learned association includes a temporal alignment of the change and the incident.

In some aspects, the techniques described herein relate to a computer-implemented system, wherein the temporal alignment is a 48 hour window between the change and the incident.

In some aspects, the techniques described herein relate to a computer-implemented system, wherein the operations are performed by using one or more Application Programming Interface (API) interactions.

In some aspects, the techniques described herein relate to a computer-implemented system, wherein the generated alert to the incident owner provides extracted keywords from the description, intended outcome, risk, justification, and implementation plan of the change proposed.

In some aspects, the techniques described herein relate to a computer-implemented system, wherein the association between extracted features of the change and extracted features of the incident provides a probability that the incident is caused by the change.

In some aspects, the techniques described herein relate to a computer-implemented system, wherein when the probability is above a predetermined threshold, the risk confirmation or rejection from the incident owner is automatically performed.

In some aspects, the techniques described herein relate to a non-transitory computer readable medium storing instructions that, when executed by one or more processors, cause the one or more processors to perform operations including: generating a first query requesting a description of a change proposed to a system and an intended outcome of the change proposed; receiving a first response from a change owner to the first query; generating, based on the first response, a second query providing a risk of an incident associated with the change proposed and requesting justification of the change proposed in view of the risk; receiving a second response from the change owner to the second query; generating, based on the second response, a third query requesting an implementation plan for the change proposed; receiving a third response from the change owner to the third query; generating, based on the first, second, and third responses, an alert to an incident owner providing the description, intended outcome, risk, justification, and implementation plan of the change proposed; receiving, based on the alert, a risk confirmation or rejection from the incident owner confirming or rejecting a relationship between the change proposed and the risk; and updating, based on the risk confirmation or rejection, a machine-learning based model to learn an association between extracted features of the change and extracted features of the incident.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

As will be apparent from the embodiments below, an advantage to the disclosed systems and methods is that the disclosed systems and methods provide an end-to-end approach to incidents, as compared to current isolated improvements per department, which will lead to increased communication and focus on common problems. The disclosed systems and methods provides a solution for all departments in a company to supply data to be commonly available for insights to all departments. As a result, a team may take actions such as extra testing, extra staff during hardware and/or software deployment, and provide directions for refactoring code, for example.

For example, the disclosed systems and methods may provide intelligent alerts to mitigate incidents, reduce development bugs, and identify risks proactively in real-time. The disclosed systems and methods may be integrated with deployment and configuration management platforms to alert operations and service delivery personnel when configuration items are modified or auto-approve non-critical changes. The disclosed systems and methods may be used in test-automation, which may reduce time to release. The disclosed systems and methods may be used with incident management to alert incident handlers about potentially code-related or change-related incidents and provide valuable information to improve speed of resolution.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts an exemplary interaction with the artificial intelligence system by a change owner.

FIG. 3 depicts an exemplary interaction with the artificial intelligence system by an incident owner.

DETAILED DESCRIPTION OF EMBODIMENTS

Figure 1:
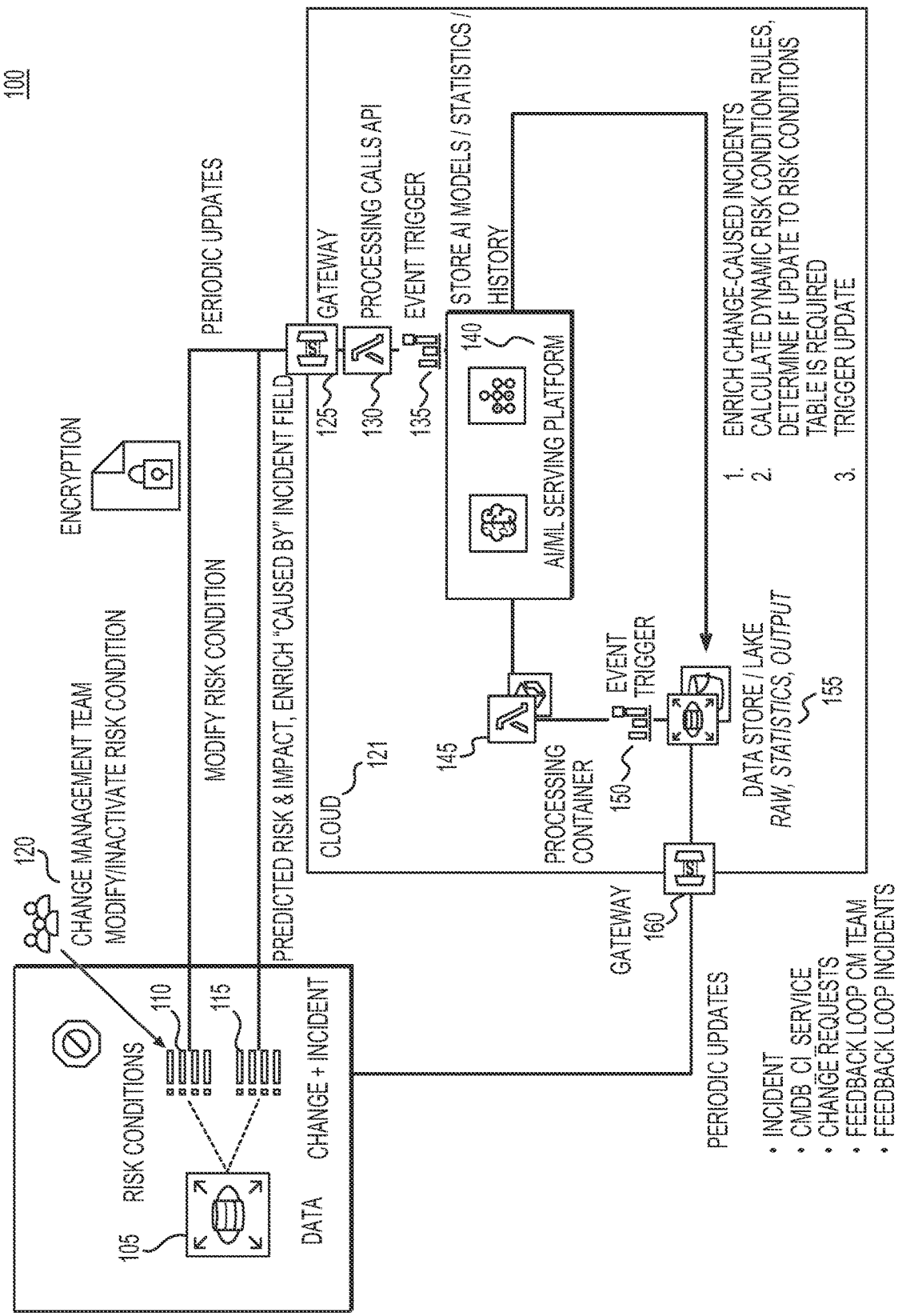
FIG. 1 depicts an exemplary system overview for using artificial intelligence to predict and troubleshoot incidents in a system, according to one or more embodiments.

The present disclosure relates generally to using artificial intelligence to predict and troubleshoot incidents in a system and, more particularly, to improving the quality of a machine-learning based model to determine a risk for a proposed modification to a system or troubleshoot an incident in the system.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Software companies have been struggling to effectively manage risk of change requests in production and only have basic tools to avoid change-caused outages. In the context of the disclosure, a change may refer to any change that could affect the operation of a system. For example, a change may refer to upgrading software or hardware components, or changing a member of a team.

One or more embodiments may enable an objective view of the risk and vulnerability of the application so that a company may make investment decisions based on risk. One or more embodiments may enable a company to take proper actions to protect high risk upgrades. One or more embodiments may be able to identify high risk change requests and can reduce a burden on a company to resolve change-caused incidents.

One or more embodiments may provide IT management, governance, and operations with a solution to assess risk and have an impact in an ongoing, dynamic way while reducing static surveys and estimates for risk. One or more embodiments may be extended to clients and users of services and software with applications that are connected to systems.

Changing a production (and lower) system may include a risk for a company. An objective, intelligent measure of change risk for a certain change request may enable teams to have the right level of scrutiny of an incoming change request and reduce product impacts/incidents and downtime, and improve customer experience.

One or more embodiments may reach many different areas of the IT operations lifecycle, such as the identification of high-risk groups or infrastructure components, and may transform the way that decisions and reviews on change implementations are made. Feedback from change governance teams may be integrated back into the AI models and improve the change risk assessment over time.

FIG. 1 depicts an exemplary system overview for using artificial intelligence to predict and troubleshoot incidents in a system, according to one or more embodiments.

As shown in FIG. 1, a Risk Assessment System 100 may include relational database 105 including risk table 110 and incident table 115.

Relational database 105 may be connected through encryption to gateway 125 in cloud 121, and may send and receive periodic updates to and from cloud 121. Cloud 121 may be a remote cloud service, a local service, or any combination thereof. Cloud 121 may include gateway 125 connected to processing API 130 which may be used with event trigger 135 to update an artificial intelligence model 140. Artificial intelligence model 140 may send and receive data, using Container Management Platform 145 and event trigger 150, to and from Relational Database Service 155. Relational Database Service 155 may be connected to relational database 105 through gateway 160, and may send and receive periodic updates to and from relational database 105 through gateway 160.

Artificial intelligence model 140 may include a machine learning component. One of the machine learning techniques that may be useful and effective for the analysis is a neural network, which is a type of supervised machine learning. Nonetheless, it should be noted that other machine learning techniques and frameworks may be used to perform the methods contemplated by the present disclosure. For example, the systems and methods may be realized using other types of supervised machine learning such as regression problems, random forest, etc., using unsupervised machine learning such as cluster algorithms, principal component analysis (PCA), etc., and/or using reinforcement learning.

FIG. 2 depicts an exemplary interaction 200 with the artificial intelligence system by a change owner.

As shown in FIG. 2, Risk Assessment System 100 may generate a first query 210 requesting a description of a change proposed to a system and an intended outcome of the change proposed. For example, the first query 210 may provide "what change are you making?" and "what is the intended outcome?". A change owner may provide a response to the first query, such as a description of a patch release for a server to protect against vulnerabilities, for example. Risk Assessment System 100 may generate, based on the response to the first query 210, a second query 220 providing a risk of an incident associated with the change proposed and requesting justification of the change proposed in view of the risk. A change owner may provide a response to the second query 220, such as a description of what might happen if the change proposed is not implemented, for example. Risk Assessment System 100 may generate, based on the response to the second query 220, a third query 230 requesting an implementation plan for the change proposed, and receive a third response from the change owner to the third query 230 describing the implementation plan.

The change proposed may include at least one of a modification of a hardware component or a software component, for example.

Risk Assessment System 100 may provide a risk identification model that may predict an incident for every change. This may be accomplished by using an incident journey, so that the system may reverse engineer and identify the patterns in incoming incidents due to code changes, by training a risk classification model that will tag changes to an incident, and by using a threshold analysis for setting the risk, such as 1.5 Interquartile Range/3 Interquartile Range and Receiver Operating Characteristic curve analysis. The thresholds may be dynamic and specific for a particular Assignment Group. The model may identify risks proactively in real-time as incident, issue ticket, and script data are collected.

Risk Assessment System 100 may provide a model that can proactively suggest code changes/resolutions for incoming incidents, by building a classification/probability prediction (for example, Multi-Layer Perceptron, Logistic Regression, or Artificial Neural Network) model to identify whether a new incident is code change related or not. If a new incident is code change related, the incident journey may be used to identify which part of the code that needs to be changed to fix the issue. In the code, the incident journey may identify which branch, file, or class or module should be changed.

Here, topic modeling, such as Latent Dirichlet Allocation or Neural Topic Modeling, and clustering, such as Bidirectional Encoder Representations from Transformers or Hierarchical Density-Based Spatial Clustering of Applications with Noise, for example, may be performed using metadata from a variety of sources to create clusters. Unsupervised learning may be done for incident descriptions, resolution notes, issue tracking tickets, and code repository commit messages, for example. Auto-labeling of the created clusters may be performed using topic modeling. The finalized clusters may be used as classes to train a supervised classifier model. Because the amount of data may be massive, various Deep Learning models such as Artificial Neural Network, Recurrent Neural Networks, and Long-Short Term Memory may be used. Using the final classification tags from the supervised model, an incident journey may be mapped. These are merely examples of a machine-learning based model, and the disclosure is not limited to these examples.

As an example, metadata may be provided from relational database 105 including incident reports with information for each incident provided with an incident number, closed date/time, category, close code, close note, long description, short description, root cause, and assignment group. As an example, the metadata may be provided from relational database 105 including incident reports with information for each incident provided with an issue key, description, summary, label, issue type, fix version, environment, author, and comments. As an example, metadata may be provided from relational database 105 including incident reports with information for each incident provided with a file name, script name, script type, script description, display identifier, message, committer type, committer link, properties, file changes, and branch information. These are merely examples of information that may be used as metadata, and the disclosure is not limited to these examples.

Figure 3:
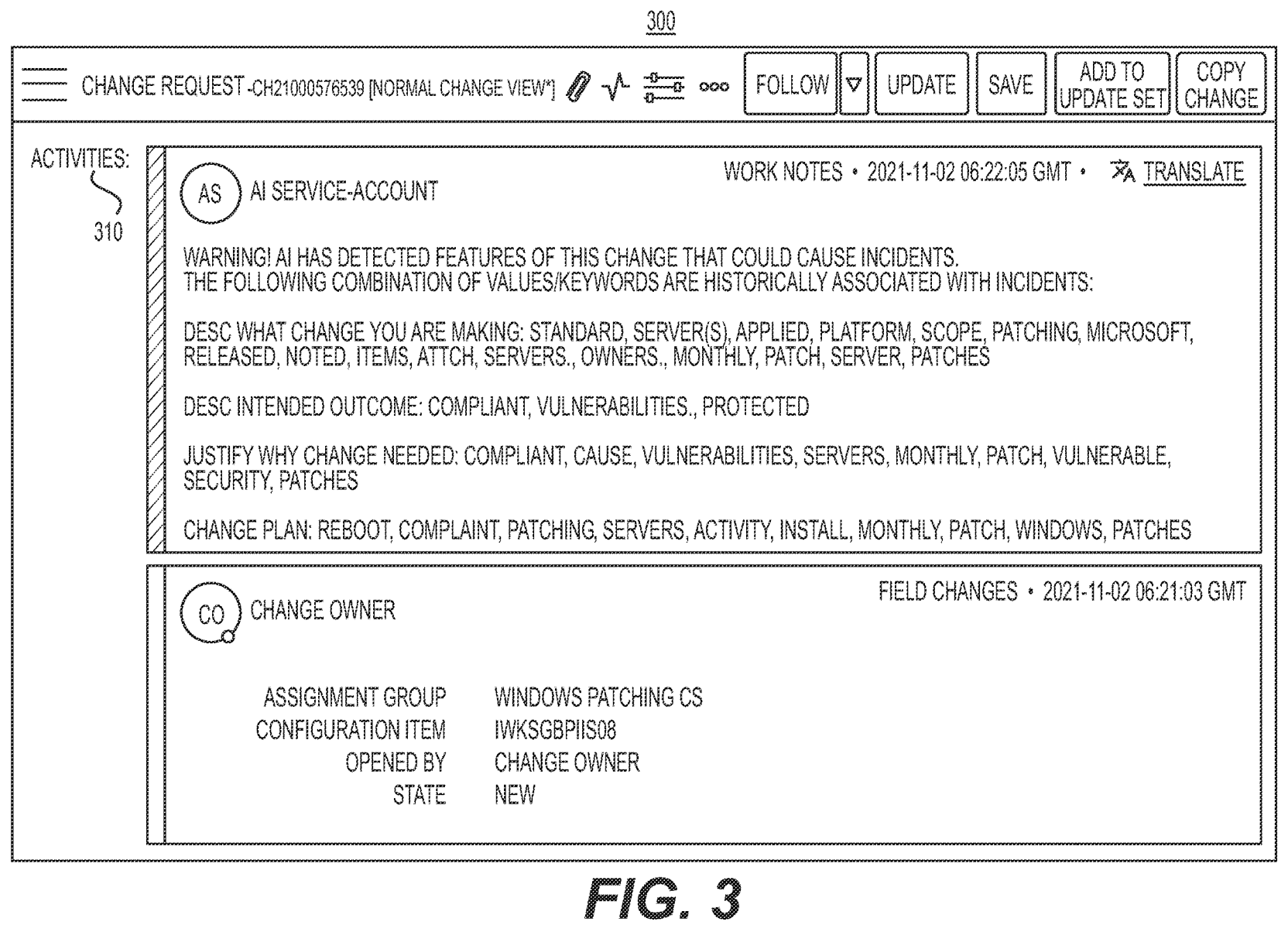

FIG. 3 depicts an exemplary interaction 300 with the artificial intelligence system by an incident owner.

As shown in FIG. 3, an incident owner and/or member of change management team 120 may receive an alert 310 based on the change owner's responses as described in FIG. 2.

Figure 4:
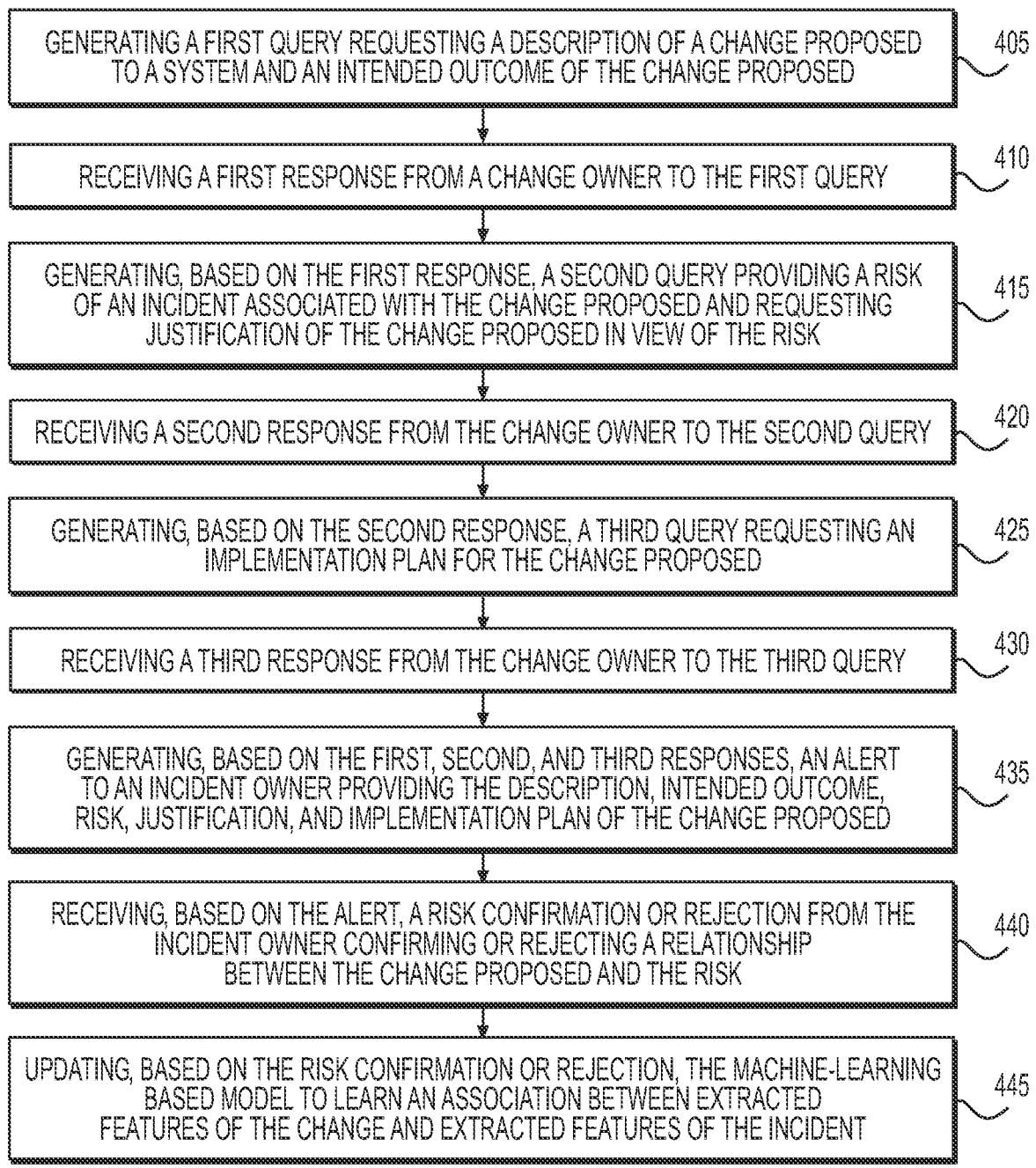
FIG. 4 depicts a flowchart of a method for improving the quality of a machine-learning based model to determine a risk for a proposed modification to a system or troubleshoot an incident in the system, according to one or more embodiments.

FIG. 4 depicts a flowchart of a method 400 for improving the quality of a machine-learning based model to determine a risk for a proposed modification to a system or troubleshoot an incident in the system, according to one or more embodiments.

As shown in FIG. 4, operation 405 may include generating a first query 210 requesting a description of a change proposed to a system and an intended outcome of the change proposed. Operation 410 may include receiving a first response from a change owner to the first query. Operation 415 may include generating, based on the first response, a second query 220 providing a risk of an incident associated with the change proposed and requesting justification of the change proposed in view of the risk. Operation 420 may include receiving a second response from the change owner to the second query. Operation 425 may include generating, based on the second response, a third query 230 requesting an implementation plan for the change proposed. Operation 430 may include receiving a third response from the change owner to the third query.

Operation 435 may include generating, based on the first, second, and third responses, an alert 310 to an incident owner providing the description, intended outcome, risk, justification, and implementation plan of the change proposed. The generated alert 310 to the incident owner may provide extracted keywords from the description, intended outcome, risk, justification, and implementation plan of the change proposed. Operation 440 may include receiving, based on the alert, a risk confirmation or rejection from the incident owner confirming or rejecting a relationship between the change proposed and the risk. Operation 445 may include updating, based on the risk confirmation or rejection, the machine-learning based model to learn an association between extracted features of the change and extracted features of the incident.

Figure 5:
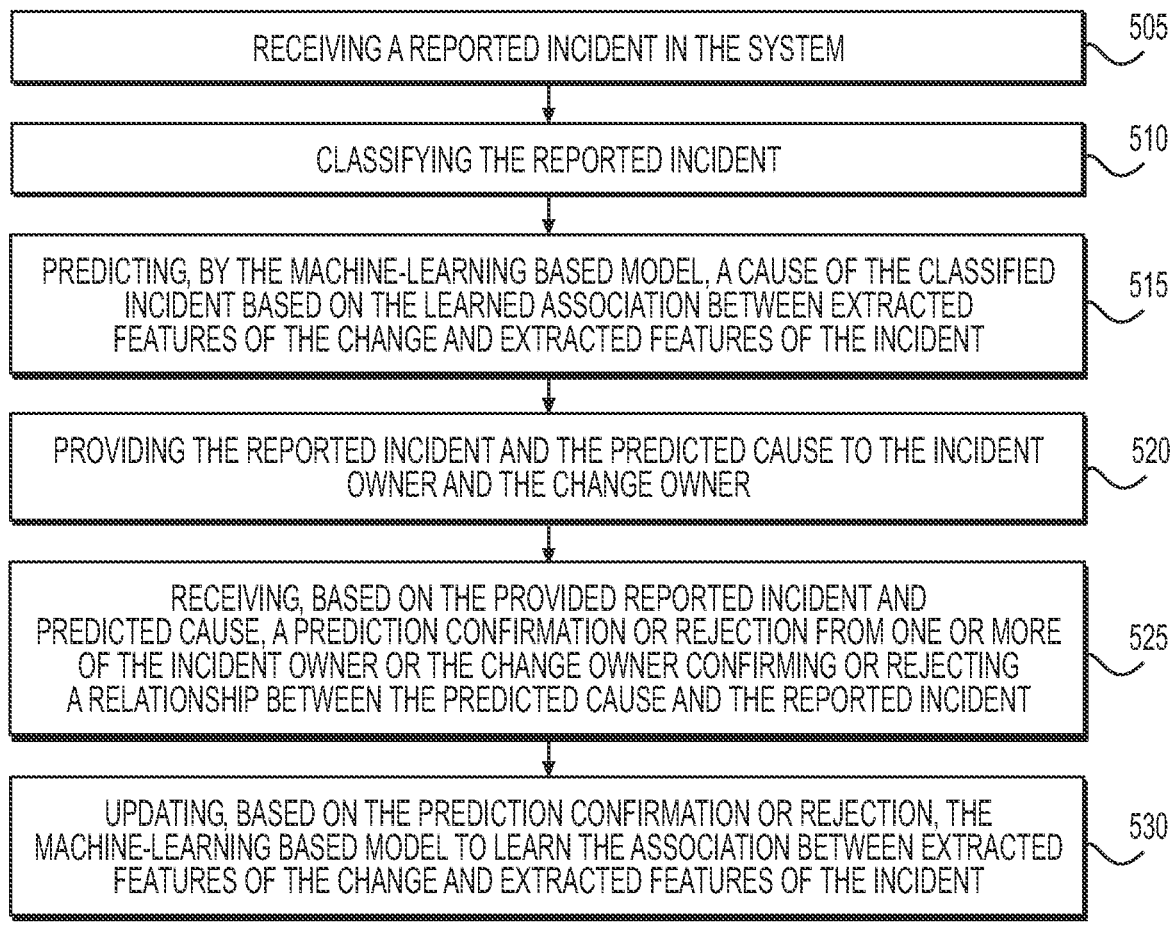
FIG. 5 depicts a flowchart of a method for improving the quality of a machine-learning based model to determine a risk for a proposed modification to a system or troubleshoot an incident in the system, according to one or more embodiments.

FIG. 5 depicts a flowchart of a method 500 for improving the quality of a machine-learning based model to determine a risk for a proposed modification to a system or troubleshoot an incident in the system, according to one or more embodiments.

As shown in FIG. 5, operation 505 may include receiving a reported incident in the system. Operation 510 may include classifying the reported incident. For example, the reported incident may be classified into an incident caused by a change to the system or an incident not caused by a change to the system. Operation 515 may include predicting, by the machine-learning based model, a cause of the classified incident based on the learned association between extracted features of the change and extracted features of the incident. Operation 520 may include providing the reported incident and the predicted cause to the incident owner and the change owner. Operation 525 may include receiving, based on the provided reported incident and predicted cause, a prediction confirmation or rejection from one or more of the incident owner or the change owner confirming or rejecting a relationship between the predicted cause and the reported incident. Operation 530 may include updating, based on the prediction confirmation or rejection, the machine-learning based model to learn the association between extracted features of the change and extracted features of the incident.

The learned association may include a temporal alignment of the change and the incident. For example, the temporal alignment may be a 48 hour window between when the change occurred and when the incident occurred. The association between extracted features of the change and extracted features of the incident may provide a probability that the incident is caused by the change. When the probability is above a predetermined threshold, the risk confirmation or rejection from the incident owner may be automatically performed. Additionally, the operations may be performed by using one or more Application Programming Interface (API) interactions, such as with processing API 130.

Figure 6:
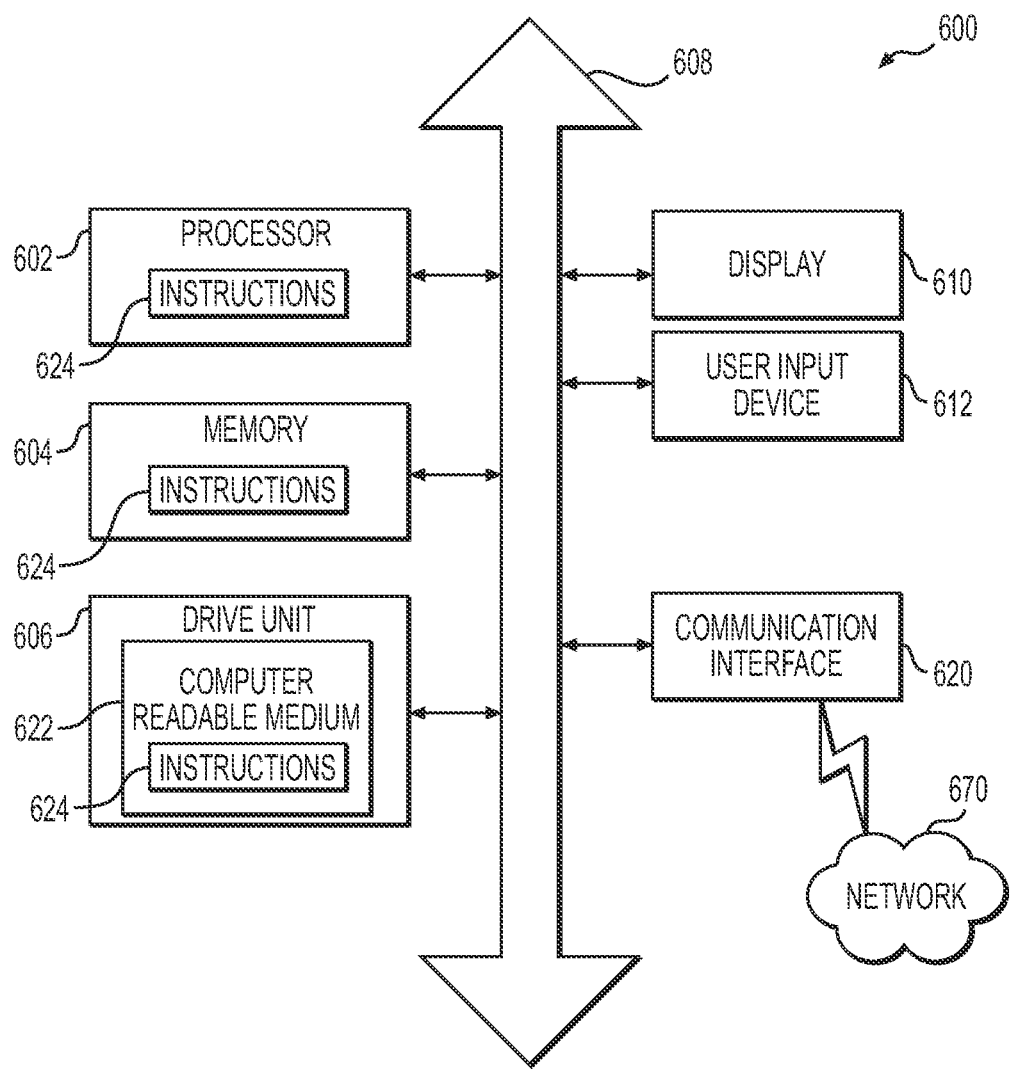
FIG. 6 illustrates an implementation of a general computer system that may execute techniques presented herein.

FIG. 6 illustrates an implementation of a general computer system that may execute techniques presented herein.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 6 illustrates an implementation of a computer system 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of computer system 600. The input device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 670, external media, the display 610, or any other components in computer system 600, or combinations thereof. The connection with the network 670 may be a physical connection, such as a wired Ethernet connection or may be established wirelessly as discussed below. Likewise, the additional connections with other components of the computer system 600 may be physical connections or may be established wirelessly. The network 670 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as falling within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for improving a quality of a trained machine-learning based model, the method comprising, performing by one or more processors, operations including:
   generating a first query requesting a description of a change proposed to a computer system and an intended outcome of the change proposed, wherein the change proposed to the system includes one or more of a modification of a hardware component of the system or a modification of a software component of the system;
   receiving a first response from a change owner to the first query;
   generating, based on the first response, a second query providing an assessment of an incident associated with the change proposed and requesting justification of the change proposed in view of the assessment, wherein the second query is different from the first query, wherein the incident results in downtime of the system;
   receiving a second response from the change owner to the second query, wherein the second response is different from the first response;
   generating, based on the second response, a third query requesting an implementation plan for the change proposed, wherein the third query is different from the first query and the second query;
   receiving a third response from the change owner to the third query, wherein the third response is different from the first response and the second response;
   generating, based on the first, second, and third responses, a model and an alert to an incident owner providing the description, intended outcome, assessment, justification, and implementation plan of the change proposed, wherein the alert is different from the first query, the second query, and the third query, and wherein the incident owner is different from the change owner, and wherein the model suggests a code change to avoid the downtime resulting from the incident;

receiving, based on the alert, an assessment confirmation or rejection from the incident owner confirming or rejecting a relationship between the change proposed and the assessment, wherein the assessment confirmation or rejection is different from the first response, the second response, and the third response;

updating, based on the assessment confirmation or rejection, the trained machine-learning based model to learn an association between extracted features of the change and extracted features of the incident;

receiving a reported incident in the system;

classifying the reported incident;

predicting, by the updated trained machine-learning based model, a cause of the classified incident based on the learned association between extracted features of the change and extracted features of the incident, wherein the prediction is a prediction that the classified incident will result in downtime of the system; and automatically implementing the code change, without user input, based on the prediction, thereby reducing the downtime of the computer system.

2. The method of claim 1, wherein the operations further include:

receiving, based on the provided reported incident and predicted cause, a prediction confirmation or rejection from one or more of the incident owner or the change owner confirming or rejecting a relationship between the predicted cause and the reported incident; and updating, based on the prediction confirmation or rejection, the trained machine-learning based model to learn the association between extracted features of the change and extracted features of the incident.

3. The method of claim 1, wherein the learned association includes a temporal alignment of the change and the incident.

4. The method of claim 3, wherein the temporal alignment is a 48 hour window between the change and the incident.

5. The method of claim 1, wherein the operations are performed by using one or more Application Programming Interface (API) interactions.

6. The method of claim 1, wherein the generated alert to the incident owner provides extracted keywords from the description, intended outcome, assessment, justification, and implementation plan of the change proposed.

7. The method of claim 1, wherein the association between extracted features of the change and extracted features of the incident provides a probability that the incident is caused by the change.

8. The method of claim 7, wherein when the probability is above a predetermined threshold, the assessment confirmation or rejection from the incident owner is automatically performed.

9. The method of claim 1, wherein the change proposed includes a modification of a team member of the system.

10. A computer-implemented system for improving a quality of a trained machine-learning based model, the computer-implemented system comprising:

a memory to store instructions; and one or more processors to execute the stored instructions to perform operations including:

generating a first query requesting a description of a change proposed to a computer system and an intended outcome of the change proposed, wherein the change proposed to the system includes one or more of a modification of a hardware component of the system or a modification of a software component of the system;

receiving a first response from a change owner to the first query;

generating, based on the first response, a second query providing an assessment of an incident associated with the change proposed and requesting justification of the change proposed in view of the assessment, wherein the second query is different from the first query, wherein the incident results in downtime of the system;

receiving a second response from the change owner to the second query, wherein the second response is different from the first response;

generating, based on the second response, a third query requesting an implementation plan for the change proposed, wherein the third query is different from the first query and the second query;

receiving a third response from the change owner to the third query, wherein the third response is different from the first response and the second response;

generating, based on the first, second, and third responses, a model and an alert to an incident owner providing the description, intended outcome, assessment, justification, and implementation plan of the change proposed, wherein the alert is different from the first query, the second query, and the third query, and wherein the incident owner is different from the change owner, and wherein the model suggests a code change to avoid the downtime resulting from the incident;

receiving, based on the alert, an assessment confirmation or rejection from the incident owner confirming or rejecting a relationship between the change proposed and the assessment, wherein the assessment confirmation or rejection is different from the first response, the second response, and the third response;

updating, based on the assessment confirmation or rejection, the trained machine-learning based model to learn an association between extracted features of the change and extracted features of the incident;

receiving a reported incident in the system;

classifying the reported incident;

predicting, by the updated trained machine-learning based model, a cause of the classified incident based on the learned association between extracted features of the change and extracted features of the incident, wherein the prediction is a prediction that the classified incident will result in downtime of the system; and automatically implementing the code change, without further input from the user, based on the prediction, thereby reducing the downtime of the computer system.

11. The computer-implemented system of claim 10, wherein the operations further include:

receiving, based on the provided reported incident and predicted cause, a prediction confirmation or rejection from one or more of the incident owner or the change owner confirming or rejecting a relationship between the predicted cause and the reported incident; and updating, based on the prediction confirmation or rejection, the trained machine-learning based model to learn the association between extracted features of the change and extracted features of the incident.

12. The computer-implemented system of claim 10, wherein the learned association includes a temporal alignment of the change and the incident.

13. The computer-implemented system of claim 12, wherein the temporal alignment is a 48 hour window between the change and the incident.

14. The computer-implemented system of claim 10, wherein the operations are performed by using one or more Application Programming Interface (API) interactions.

15. The computer-implemented system of claim 10, wherein the generated alert to the incident owner provides extracted keywords from the description, intended outcome, assessment, justification, and implementation plan of the change proposed.

16. The computer-implemented system of claim 10, wherein the association between extracted features of the change and extracted features of the incident provides a probability that the incident is caused by the change.

17. The computer-implemented system of claim 16, wherein when the probability is above a predetermined threshold, the assessment confirmation or rejection from the incident owner is automatically performed.

18. A non-transitory computer readable medium storing instructions that, when executed by one or more processors, cause the one or more processors to perform operations including:
   generating a first query requesting a description of a change proposed to a computer system and an intended outcome of the change proposed, wherein the change proposed to the system includes one or more of a modification of a hardware component of the system or a modification of a software component of the system;
   receiving a first response from a change owner to the first query;
   generating, based on the first response, a second query providing an assessment of an incident associated with the change proposed and requesting justification of the change proposed in view of the assessment, wherein the second query is different from the first query, wherein the incident results in downtime of the system;
   receiving a second response from the change owner to the second query, wherein the second response is different from the first response;
   generating, based on the second response, a third query requesting an implementation plan for the change proposed, wherein the third query is different from the first query and the second query;
   receiving a third response from the change owner to the third query, wherein the third response is different from the first response and the second response;
   generating, based on the first, second, and third responses, a model and an alert to an incident owner providing the description, intended outcome, assessment, justification, and implementation plan of the change proposed, wherein the alert is different from the first query, the second query, and the third query, and wherein the incident owner is different from the change owner, and wherein the model suggests a code change to avoid the downtime resulting from the incident;
   receiving, based on the alert, an assessment confirmation or rejection from the incident owner confirming or rejecting a relationship between the change proposed and the assessment, wherein the assessment confirmation or rejection is different from the first response, the second response, and the third response;
   updating, based on the assessment confirmation or rejection, a trained machine-learning based model to learn an association between extracted features of the change and extracted features of the incident;
   receiving a reported incident in the system;
   classifying the reported incident;
   predicting, by the updated trained machine-learning based model, a cause of the classified incident based on the learned association between extracted features of the change and extracted features of the incident, wherein the prediction is a prediction that the classified incident will result in downtime of the system; and
   automatically implementing the code change, without user input, to reduce the downtime of the computer system.

19. The non-transitory computer readable medium of claim 18, wherein the instructions, when executed by the one or more processors, cause the one or more processors to perform the operations further including:
   receiving, based on the provided reported incident and predicted cause, a prediction confirmation or rejection from one or more of the incident owner or the change owner confirming or rejecting a relationship between the predicted cause and the reported incident; and
   updating, based on the prediction confirmation or rejection, the trained machine-learning based model to learn the association between extracted features of the change and extracted features of the incident.

20. The non-transitory computer readable medium of claim 18, wherein the learned association includes a temporal alignment of the change and the incident.

* * * * *